Feb. 4, 1930.  M. J. HUGGINS  1,745,488
ELECTRIC INDICATING INSTRUMENT
Filed Nov. 7, 1924
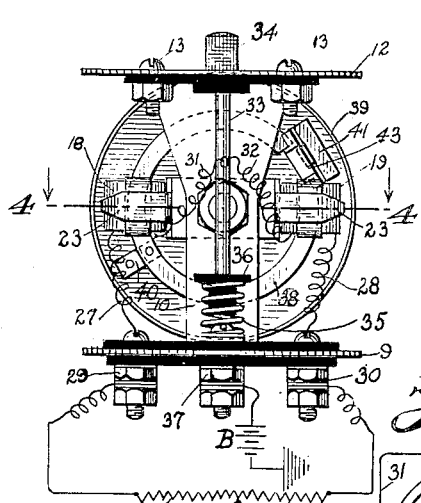
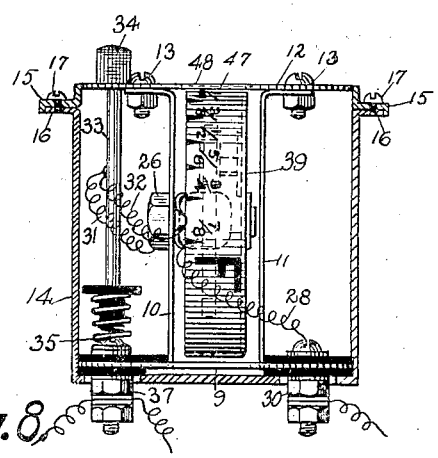
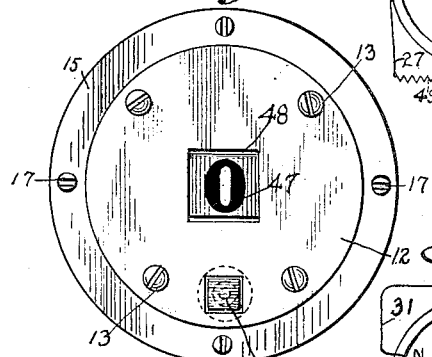
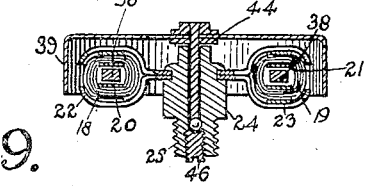
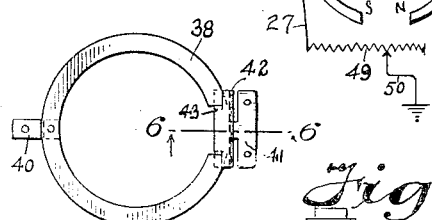
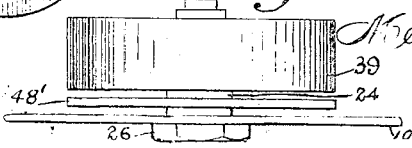
INVENTOR
Merion J. Huggins
BY
John O. Seifert
HIS ATTORNEY Patented Feb. 4, 1930

1,745,488

UNITED STATES PATENT OFFICE

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE

ELECTRIC INDICATING INSTRUMENT

Application filed November 7, 1924. Serial No. 748,440.

This invention relates to electric indicating instruments, the present invention being an improvement on the electric indicating device illustrated and described in my co-pending application Serial No. 723,241 embodying an armature and a pair of solenoids to generate magnetic fields and the armature having an indicator associated therewith, said elements being arranged whereby one is movable relative to the other through the attracting or repelling forces of the generated magnetic fields upon the armature, the actuation of the indicating means being effected by variations induced in the magnetic value of one of said forces relative to the magnetic value of another of said forces by means connected in circuit with the element for generating the magnetic fields, the indicating instrument being particularly adapted for use in connection with motor vehicles to ascertain the quantity of gasolene in the usual gasolene storage tank carried by the vehicle, or the quantity of oil in the crank case of the engine constituting the motive power for the vehicle, and it is the primary object of the invention to improve the general construction and arrangement of said instrument to reduce the cost of manufacture and increase the efficiency of the instrument.

Instruments of this character when used in motor vehicles, are mounted upon the instrument board of the vehicle which is often made of metal, or they are located in close proximity to other electrical translating devices connected in circuit with the same source of electric energy as the instrument, with the result that electromotive and magnetic forces external of the instrument are set up which have a tendency to and do derange and interfere with the proper functioning of the instrument and therefore a true indication cannot be determined by the instrument, and it is a further object of the invention to overcome the above disadvantages by providing a magnetic shield to screen the indicating mechanism from derangement by electromotive or magnetic forces external of the instrument.

Other objects and advantages will hereinafter appear.

In the drawing accompanying and forming a part of this specification there is shown an embodiment of the invention in which Figure 1 is a side elevation looking at the left of Figure 2 with the enclosing casing for the mechanism removed.

Figure 2 is a side elevation looking at the right of Figure 1 and showing the enclosing casing for the mechanism in section.

Figure 3 is a view looking at the top of Figure 1.

Figure 4 is a cross sectional detail view taken on the line 4—4 of Figure 1 looking in the direction of the arrows to show the arrangement of the magnetic force generating means, the polarized element and the mounting of the carrier for the latter and showing the relative position of the parts.

Figure 5 is a plan view of the polarized element and the mounting therefor.

Figure 6 is a cross sectional view of the carrier for the polarized element to show the manner of mounting the latter therein, the carrier being shown in inverted position to that shown in Figure 4.

Figure 7 is an elevational view of a modified construction of the carrier for the polarized element and the magnetic force generating means.

Figure 8 is a diagrammatic view to illustrate an electric hook up of the different parts of the instrument shown in Figures 1 and 2; and Figure 9 is a diagrammatic view illustrating the modified hook up of the different parts of the instrument.

In carrying out the embodiment of the invention illustrated in the drawing there is provided, as shown in Figure 2, a support for the operative mechanism of the instrument comprising a plate 9 and a pair of parallel legs 10, 11 extending substantially at right angles to and preferably constructed integral with the plate 9, although they may be constructed separately and attached to the plate. The legs are flanged laterally at the ends opposite to the plate 9 and carry a plate or disk 12, said disk being secured to the leg flanges by suitable means, such as rivets or screws as shown at 13. The parts 9 to 13 inclusive are of non-magnetizable material, such as brass. The disk is adapted to serve as a cover for a cup shaped enclosing casing 14 of suitable material for the operative parts of the mechanism, the cover being releasably connected to said casing, for which purpose it is provided with a peripheral rim 15 to engage a lateral flange 16 at the open end of the casing and detachably secured thereto by screws 17, and by means of which closure rim and the casing flange the instrument is adapted to be mounted in an opening of a support, such as the instrument board of a motor vehicle. The casing is preferably made of a material which is not susceptible to magnetic forces from the instrument and particularly from such forces external to the instrument, such as brass, although it has been found that a tin coated magnetizable but non-polarized material, such as sheet steel will not only answer the purpose but also function as a magnetic shield for the magnetically operated parts within the same.

The magnetic force generating means comprises a pair of solenoids 18, 19 the coils of which are wound upon spools 20, 21 whereby they are mounted in carriers 22, 23 and the latter fixedly mounted upon the leg 10, in the present instance through a stud 24, the coils being arranged in diametrically opposite relation with the centers of the solenoids spaced equidistant from the axis of the post 24. The stud 24 is fixed in the leg 10 intermediate the plates 9, 12 by engaging a threaded reduced end 25 of the stud in a perforation in said leg 10 so that said stud will extend in a direction toward and adjacent the leg 11, the stud being secured in position by a nut 26 threaded onto the reduced end of the stud at the side of the leg 10 opposite to the stud and clamping the leg between the shoulder of the stud formed by the reduced threaded end and the nut. One terminal 27, 28 of the coils 18, 19 is connected to contact terminals in the form of binding posts 29, 30 carried by and insulated from the plate 9, the opposite terminals 31, 32 of the coils being electrically connected through a movable contact making member, in the form of a stem 33, carried by and insulated from a push button 34 slidably engaging in a perforation in the plate 12 and normally urged in a direction outward from said plate with a shoulder of the button in contact therewith by a spring 35 coiled about and confined between the flange of an insulator sleeve 36 on the stem 33 and a fixed contact terminal in the form of a binding post 37 carried by and insulated from the plate 9, which post is adapted to be connected to a source of current supply, such as a battery illustrated in a conventional manner at P. The electrical connections of the coils with the binding posts 29, 30 and with the movable contact 33 is such that the flow of current through the coils is in opposite directions and whereby the magnetic fields or forces generated by said coils will exert forces in opposite directions for a purpose to be hereinafter set forth. The coils are electrically connected with the source of current supply or battery through the movable contact terminal 33 and contact terminal or binding post 37.

An armature 38 of arcuate or split ring form subtending through an arc of less than 360 degrees and preferably more than 180 degrees is supported to rotate about its axis and on the axis of the coil support and move in a plane in line with the openings through the coil carrying spools and the centers of the magnetic fields generated by the coils, the movement of the armature being predetermined and the armature being of a length to engage in the zones of the magnetic fields generated by the coils to be influenced thereby in all positions of the armature. For this purpose there is provided a carrier 39 of circular cup shape, said armature being pivotally mounted intermediate its ends in said carrier by a bracket 40 and at its extremities by a bracket 41 by engaging the end portions of the armature in opposite ends of a U shaped portion 42 of the bracket with the extremities of the armature in abutting relation to ears 43 stamped from and bent into the U shaped portion of the bracket, as clearly shown in Figures 5 and 6, whereby the armature is held against movement on its pivotal support on the bracket 40. The carrier for the armature is rotatably supported by the stud 24 to surround the magnetic force generating coils and armature and in equidistant spaced relation to the armature. For this purpose a pivot 44 is fixed axially of the carrier to extend into the same, which pivot is engaged in a bore of the stud 24 from the end opposite to the threaded reduced end 25 with the end of the pivot engaging a ball 45 engaging a seat arranged in an adjustable plug 46 threaded into the enlarged opposite end of the stud bore. By this arrangement the carrier is rotatably supported with the least possible frictional resistance to the rotation thereof. The armature is adapted to be moved by the action of the magnetic fields generated by the coils either through an attracting or a repelling force of said fields, and for this purpose it is made of magnetizable material, such as soft iron when the coils are arranged so that the fields will exert an attractive force upon the aramture, or hardened steel which will become polarized through the action of the magnetic fields generated by the coils thereon, or when made of steel it may be polarized and constitute a permanent magnet. For illustrative purposes of an operative device the invention is illustrated and described as utilizing an armature of this latter type. The length of the armature is determined by the spacing of the coils one relative to the other, and the length of the coils is determined by the movement of the armature, an armature of a length substantially as illustrated and coils approximately ⅜ths of an inch in length and spaced approximately 180 degrees apart have been found to operate efficiently, it being essential that the coils be spaced a distance apart and that the armature be of a length so that it will be within the effective zones of both of the magnetic fields generated by the coils in all positions thereof. While the flux leakage is maximum at or near the gap and ends of the armature the flux fields extend around the armature ring each way for more than 90 degrees, and thus with the coils spaced approximately 180 degrees apart the flux fields generated thereby are in a position to very effectively coact with the armature to move the same under the force thereof, the armature being in the effective zones of the fields in all positions thereof as stated. In the present arrangement of instrument wherein the indicator is in the form of a drum having indicating indices about the periphery such spacing of the coils is desirable, since the armature with the indicator may have a greater travel and it permits of a better spacing of the indicator indices about the indicator drum. The carrier is adapted to serve as a magnetic shield to screen the coils and polarized element from electromotive or magnetic forces external to the instrument, which may be set up by electric current conductors adjacent the instrument or by other electrical translating devices mounted in proximity to the instrument. It has been found that this result can be efficiently accomplished by making the carrier of a tinned magnetizable but non-polarized material, such as sheet steel.

Tests have demonstrated that the carrier 39 constructed as shown in Figure 4 will operate to effectively shield the polarized element and coils from electromotive and magnetic forces external thereto. This is accomplished by so constructing and arranging the carrier and the mounting of the polarized element in relation thereto that they are at all times in equidistant spaced relation. However, to provide a shield to entirely surround the polarized element and coils, although tests have demonstrated that this is not absolutely essential to the magnetic shielding of the instrument, a disk 48' of the same material as the carrier 39 and of substantially the same diameter as the carrier is arranged at the open end of the carrier, as shown in Figure 7, the disk being clamped between the shoulder formed by the reduced end 25 of the stud 24 and a washer interposed between the same and the leg 10.

The carrier 39 is also adapted to serve as an indicator for which purpose it has a scale or dial arranged on the periphery thereof as indicated at 47, which may be applied directly thereto or printed on a strip of paper or the like and attached to the carrier. The carrier 39 is of such diameter and the mounting so arranged that the periphery is in adjacent relation to the plate 12 and a portion thereof adapted to be exposed for visual observation through an opening or window 48 in the plate 12, clearly shown in Figures 2 and 3, which opening is preferably closed as by a piece of glass or celluloid attached to the underside of the plate at the marginal portions of the opening. In the present instance the instrument is adapted for use in ascertaining the quantity of liquid in a tank located at a place remote from the instrument, such as the quantity of gasolene in the gasolene tank of a motor vehicle, or the oil in the crank case of the engine of the motor vehicle, for which purpose the scale or dial is graduated or calibrated to indicate quantity by measure, such as gallons, or as in the present instance to indicate the position of the liquid level in the tank.

The indicator comprising the armature and its carrier 39 is actuated by the influence of the magnetic forces or fields generated by the coils 18, 19, one of which forces is adapted to be varied relative to the other; that is, by an increase or decrease in the force of the field generated by one coil and a proportional decrease or increase in the force of the field generated by the other coil, and said forces acting upon the polarized element to move the same in opposite directions, in the present instance where the armature is polarized in the direction of either its north pole or its south pole, which is due to the direction of the passage of the electric current through the coils. This variation in the magnetic forces generated by the coils is effected by differentially energized coils by varying the strength of the electric current flow by means of a variable resistance device, illustrated in a conventional manner at 49, connected in circuit with the terminal 27, 28 of the coils through the binding posts 29, 30.

As stated the embodiment of the invention illustrated and described is particularly adapted for use for indicating the quantity of liquid in a tank. For this purpose the variable resistance device is arranged in a tank containing the liquid the quantity of which is to be ascertained and indicated by the indicating instrument. This resistance device may be of a suitable construction and arrangement, an embodiment of which is illustrated in my co-pending application Serial No. 723,241 hereinbefore referred to, wherein a series of resistance coils connected in series and in circuit with the coils 18, 19 are mounted upon a dielectric support arranged in a carrier of non-magnetizable but conducting material, which carrier may be electrically connected with the battery, but in motor vehicle practice is grounded in the vehicle frame similar to the battery. This resistance device is mounted in the tank to extend from the top to the bottom thereof, and connected in circuit with the coils 18, 19 through any of a series of contact makers of magnetizable material connected in circuit with the coils of the resistance device, depending upon the liquid level in the tank, by attracting and moving said contacts into contact and connecting the same in circuit with the carrier for the dielectric support by a magnet, indicated at 50, carried by a float mounted upon the carrier to have movement along the same through the rise and fall of the liquid in the tank, moving the particular contact attracted by the magnet toward the carrier, or connecting the same in circuit with the battery, and as the circuit for the coils 18, 19 is closed by the movable contact 33 connecting the portions of the resistance device at opposite sides of the contact attracted by the magnet in circuit with said coils 18, 19. In Figure 8 I have illustrated in a diagrammatical manner the electrical hook up of the magnetic force generating coils 18, 19 with the different contacts in circuit with the resistance device the different parts having been given the same reference characters.

Assuming the tank is full, the magnet carrying float represented by 50, will be at the top of the tank, or at the extreme left as viewed in Figures 1 and 8, cutting out all of the resistance device from the coil 18 and connecting all of the resistance device into the circuit of coil 19, whereby the value of the magnetic force generated by said coil 18 will be increased and the value of the magnetic force generated by the coil 19 proportionately decreased and the directive force of the force generated by coil 18 will coact with the armature to move it in the direction indicated by the arrow $a$ against the force generated by the coil 19 and position the armature and its carrier so that an index "F" at the end of the scale upon said carrier 39 will be exposed through the opening 48 of the cover plate 12. As the liquid level in the tank falls the contact 50 will be moved downward with the float relative to the resistance device, or to the right as viewed in Figures 1 and 8, and assuming that the tank has been emptied to one-half of its capacity said contact maker will be positioned substantially midway between the termini of the resistance device 49. In such position upon the closing of the circuit for the coils 18, 19 substantially one-half of the resistance device will be connected in circuit with each of said coils and each coil will generate a magnetic force the value of one of which forces is substantially equal to the other, which forces co-act with the armature to move it in the direction of the arrow $b$ until it assumes substantially a position of equilibrium between the two forces generated by the coils and expose the index "½" on the scale of the carrier 39 through the window 48 indicating that the tank is one-half full. It will be obvious that as the liquid is continued to be withdrawn from the tank that the contact maker will continue to travel downward in the tank or from the left to the right as indicated in Figures 1 and 8, and cut out more of the resistance device from the coil 19 and connect a proportional amount into circuit with the coil 18 decreasing the value of the force generated by said latter coil and proportionately increasing the magnetic force generated by coil 19, and such force moving the armature to position an index "0" at the other extreme end of the scale to be exposed through the window 48 and indicating that the tank is empty.

In Figure 9 I have shown in a diagrammatic manner a modified electrical hook up of the different elements of the instrument. In said arrangement the magnetic field or force generated by the coil 19 is of uniform value and the actuation of the indicator is effected by varying, that is decreasing and increasing the magnetic force generated by the coil 18 relative to the force generated by coil 19. In said arrangement the coil 19 has the one terminal 32 connected to the contact maker 33 and the other terminal 28 connected to the battery, but in motor vehicle practice grounded in the vehicle frame the same as the battery, and has a suitable resistance device, of a fixed value, indicated at 51, interposed between said coil and the ground, which resistance device may comprise a resistance coil. The coil 18 has the one terminal 31 connected to the contact maker 33 and the other terminal connected to one terminal of the resistance device 49 the same as in the arrangement shown in Figure 8, and adapted to have different portions of said resistance device connected into and cut out of the circuit thereof by the contact maker 50 and grounded through the latter. The resistance device in the tank is equal to twice the value of the resistance coil 51. Should all of the resistance 49 be connected in the coil 18 the force of the field generated by said coil will be one half the value of the force generated by the coil 19 and said force generated by said coil acting on the armature will influence and move the same to position the "0" index on the indicator drum to expose it through the window 48. Should one half of the resistance 49 be connected in the coil 18 the forces generated by the two coils will be equal and act on the armature to move the same to position the indicator drum to expose the index "½" through the casing window, and should all of the resistance 49 be cut out of the coil 18 the force of the field generated by said coil will have a value one half of that generated by the coil 19 and the force of the latter coil will act on the armature to move the same to position the indicator drum to expose the index "F" through the window.

While I have described the indicating device as being particularly adapted for use in ascertaining the quantity of liquid in a tank it will be obvious and understood that the same may be as readily adapted for use as an ammeter or volt-meter and come within the scope of the invention. Furthermore, the invention is not limited in scope to the exact details of construction and arrangement of parts, and various modifications may be resorted to and portions of the invention used without others without departing from the scope of the invention.

While I have illustrated and described the instrument for use in connection with a normal open circuit which is closed by the actuation of a circuit closer by a push button 34 in order to procure a reading upon the instrument, which is preferable in motor vehicle practice wherein the source of electric current is a storage battery in order to conserve current, it will be obvious that the instrument may be connected in a normally closed circuit.

Having thus described my invention, I claim:

1. In an electric indicating instrument, a casing arranged with an opening, a frame mounted in the casing, a pair of coils, a support fixed in the frame upon which the coils are mounted in equidistant spaced relation thereto and spaced from each other, a cup shaped member having calibrations arranged upon the periphery of the flange thereof, an armature member of arcuate form mounted concentrically in the cup shaped member, and means to rotatably mount the cup shaped member with the arcuate member upon the coil support to have oscillatory movement on the axis of said cup shaped and arcuate members with the cup flange surrounding the coils and the arcuate member arranged to move in a plane coincident with the core of the coils, and calibrations on the cup shaped member to be exposed through the opening in the casing to adapt said member as an indicator.

2. An electric indicating instrument as claimed in claim 1, wherein the arcuate member is mounted in the cup shaped member by brackets of non-magnetizable material at the ends and intermediate the ends, said brackets being adapted to cooperate with the coils to limit the movement of the cup shaped and arcuate members and retain the arcuate member within the zones of the magnetic fields of the coils in all positions thereof, and the cup member is constructed of a material which will screen the arcuate member and coils from magnet forces external of the instrument.

3. An electric indicating instrument as claimed in claim 1, wherein the coil support is in the form of a pair of arms fixed on a post, and the cup shaped member with the arcuate member is rotatably carried by said post by a pivot pin fixed to the cup shaped member, axially of said member and the arcuate member, engaged in a bore in the post and having an antifriction bearing therein.

4. In an electric indicating instrument, a magnetic force generating element and an armature element of arcuate form and subtending through an arc of less than 360 degrees, one of which elements is fixed and the other pivotally supported and adapted to be moved by the action of the magnetic forces on the armature, and a cup shaped member to participate in the movement of the movable element arranged with the flange to extend about said elements and having indicating indices about the periphery thereof to arrange said member to serve as an indicator.

5. An electric indicating instrument as claimed in claim 4, wherein the magnetic force generating element is fixed and the armature is rotatably supported on the axis of the cup shaped member and said member is constructed of a material to serve as a shield to screen the elements from magnetic forces exterior of the instrument.

6. In an electric indicating instrument, an arcuate armature subtending through an arc of less than 360 degrees and supported to oscillate about its axis and have movement in predetermined limits, a pair of coils arranged to generate opposed magnetic fields spaced with the centers equidistant from the axis of the armature and arranged with their openings in the plane of movement of the armature, and said armature being of a length to be within and under the influence of the magnetic fields and be moved thereby, and an indicator dial movable with the armature.

7. In an electric indicating instrument, a pair of coils, an armature of arcuate form subtending through an arc of less than 360 degrees and supported to have a limited oscillatory movement about its axis, said coils being arranged whereby the magnetic field generated by one coil will be out of the influence of the field generated by the other coil and the armature being arranged to have movement in said coils and be within the zones of the magnetic fields generated by both coils in all positions thereof, and a cup shaped member to extend around the coils and participate in the movement of the armature and arranged with graduations on the exterior thereof to adapt the same as an indicator.

8. In an electric indicating instrument, a pair of fixed and diametrically oppositely arranged coils, an armature of arcuate form subtending through an arc of less than 360 degrees, a cup shaped indicator member supported to have oscillatory movement and carrying said armature axially thereof, the centers of said coils being spaced equidistant from the center of the armature and arranged for the armature to have movement in a plane in line with the axis of the coils and being arranged to be moved with the cup shaped member under the influence of the fields generated by the coils, and said armature being of a length and arranged with means to co-operate with the coils to retain the armature in and under the influence of both magnetic fields in all positions thereof.

9. In an electric indicating instrument, a pair of fixed coils arranged to generate opposed magnetic fields, an armature of arcuate form subtending through an arc of less than 360 degrees supported and arranged to have limited oscillatory movement about its axis and to move in a plane in the direction of its pole pieces and the lines of force of the magnetic fields, and said coils and polarized member being arranged whereby the arcuate member will be within the zones of both magnetic fields in all positions thereof and actuated jointly thereby, and indicating means actuated by the armature member.

10. In an electric indicating instrument, a fixed support, a pair of coils fixed to said support to extend radially in equidistant spaced relation from the support and spaced from each other, a circular cup shaped member pivotally mounted axially upon the support with the flange arranged to extend around said coils, and an armature of arcuate form carried axially within the cup shaped member, said armature having a radius substantially the same as the distance of the coils from the support and have movement in a plane in line with the axis of the coils and moved with the cup shaped member under the influence of the magnetic fields generated by the coils, and indicator graduations on the periphery of the cup shaped member to arrange the same as an indicator.

11. In an electric indicating instrument, a fixed support, a pair of coils arranged to generate opposed magnetic fields, means mounted on the support to carry said coils in equidistant spaced relation to the support and the coils spaced from each other with one coil out of the zone of the magnetic field generated by the other coil, an arcuate armature member the radius of the arc of which member is equal to the distance of the coils from the support, a carrier for the armature member, a pivot fixed to the carrier axially thereof and of the armature member and mounted on the coil support to have oscillatory movement and arranged to position the armature member to have movement within the openings of the coils and to be moved under the influence of the fields of said coils, and indicator graduations arranged on the carrier to adapt it to function as an indicator.

12. In an electric indicating instrument, an armature member of arcuate form, and means to generate a pair of opposed magnetic fields one of which is fixed and the other variable relative thereto, said armature member being adapted to be moved under the influence of of the magnetic fields thereon, and a cup shaped member participating in the movement of the movable member arranged to surround the armature member and magnetic field generating means and to function as an indicator.

13. In an electric indicating instrument, a pair of spaced magnetic field generating coils, a polarized member of arcuate form pivotally supported centrally between the coils to have oscillatory movement about its axis in the direction of its pole pieces and in the lines of force of the magnetic fields under the influence of said fields, and a member movable with the polarized member and surrounding said member and the coils in equidistant spaced relation thereto constructed of a material to serve as a magnetic shield and arranged as an indicator.

14. In an electric indicating instrument, a casing arranged with a sight opening, a pair of magnetic field generating coils fixed in the casing, an armature member of arcuate form supported in the casing to have oscillatory movement and arranged to be within the zones of and under the influence of the fields of said coils in all positions thereof, indicating means actuated by the armature member and adapted to be exposed through the casing opening for observation, a pair of contact terminals carried by and insulated from the casing, one terminal of one coil being connected with one of said contact terminals and a terminal of the other coil connected with the other contact terminal, a third contact terminal carried by and insulated from the casing, a contact maker to which the other terminal of the one coil is connected to make contact with the third contact terminal to close the circuit of the coils and normally urged to position out of contact therewith, and said contact terminals being arranged for connection of conductors exterior of the casing for connecting the instrument with a source of electric energy.

Signed at New York city, in the county of New York and State of New York, this 28th day of October, 1924.

MERION J. HUGGINS.